United States Patent
Montgomery et al.

[11] Patent Number: 5,809,120
[45] Date of Patent: Sep. 15, 1998

[54] TELECOMMUNICATIONS NETWORK CIRCUIT USAGE MEASUREMENT

[75] Inventors: Robert H. Montgomery, Herndon; J. Alfred Baird, Fairfax, both of Va.

[73] Assignee: Bell Atlantic Network Services, Inc., Arlington, Va.

[21] Appl. No.: 598,772

[22] Filed: Feb. 9, 1996

[51] Int. Cl.[6] ............ H04M 15/00; H04M 15/06; H04N 7/00

[52] U.S. Cl. ............ 379/113; 379/115; 379/121; 379/134; 348/1; 455/2

[58] Field of Search .................. 379/112, 113, 379/114, 115, 121, 122, 125, 126, 133, 134; 348/1–5; 455/2

[56] References Cited

U.S. PATENT DOCUMENTS

| | | |
|---|---|---|
| 4,381,522 | 4/1983 | Lambert . |
| 4,506,387 | 3/1985 | Walter . |
| 4,888,638 | 12/1989 | Bohn . |
| 4,890,320 | 12/1989 | Monslow et al. . |
| 4,893,248 | 1/1990 | Pitts et al. . |
| 4,949,187 | 8/1990 | Cohen . |
| 4,963,995 | 10/1990 | Lang . |
| 4,995,078 | 2/1991 | Monslow et al. . |
| 5,027,400 | 6/1991 | Baji et al. . |
| 5,057,932 | 10/1991 | Lang . |
| 5,065,393 | 11/1991 | Sibbit et al. ............... 348/3 |
| 5,130,792 | 7/1992 | Tindell et al. . |
| 5,132,992 | 7/1992 | Yurt et al. . |
| 5,133,079 | 7/1992 | Ballantyne et al. . |
| 5,200,993 | 4/1993 | Wheeler et al. . |
| 5,247,347 | 9/1993 | Litteral et al. . |
| 5,253,275 | 10/1993 | Yurt et al. . |
| 5,363,433 | 11/1994 | Isono ............................. 348/1 |
| 5,410,343 | 4/1995 | Coddington et al. . |
| 5,475,740 | 12/1995 | Biggs, Jr. et al. .................. 348/3 |
| 5,483,276 | 1/1996 | Brooks et al. .................. 348/1 |
| 5,499,046 | 3/1996 | Schiller et al. .................. 348/3 |
| 5,515,425 | 5/1996 | Penzias et al. .................. 379/113 |
| 5,553,124 | 9/1996 | Brinskele .................. 379/113 |
| 5,581,610 | 12/1996 | Hooshiari .................. 379/113 |

*Primary Examiner*—Curtis Kuntz
*Assistant Examiner*—Paul Loomis
*Attorney, Agent, or Firm*—Lowe, Price, LeBlanc & Becker

[57] ABSTRACT

A system and method is provided for using underused or unused local telephone company local loops to subscriber premises for providing to such premises a connection to an alternate service provider. The use of the local loop is leased to the ultimate service provider at a rate dependent upon the usage and nature of usage of the circuit. Information and data to permit efficient and convenient billing for leased usage of the loops is implemented by providing on the local loop a passive monitor. The monitor detects and temporarily stores data relating to the commencement and termination of the signaling, the time of day, and the nature of the signaling that occurs. Data collected from the monitors is stored at a monitor center from which it is transferred to a billing operation such as the telephone company Revenue Accounting Office (RAO). Switching is provided to permit optional usage of the loop by either the telephone company of the alternate service provider or both. The use of a single local loop by multiple alternate service providers is also possible.

22 Claims, 4 Drawing Sheets

TELECOMMUNICATIONS NETWORK CIRCUIT USAGE MEASUREMENT

FIELD OF INVENTION

This invention relates to the measurement of usage of specific portions of links in a telecommunications network and, more particularly, to a system and method for monitoring, detecting and measuring third party usage of predetermined links in a telecommunication network.

BACKGROUND ART

In the current communications environment multiple types of communication services and/or broadcasts are being provided to communication service customers over varying types of delivery links provided by different service providers. Telecommunications services are being provided to residences and businesses via the conventional loop and trunk circuits over which both voice and data are transmitted. At the present time the data transmissions over these circuits include facsimile, packet, imaging, and video content.

U.S. Pat. No. 5,200,993, issued Apr. 6, 1993, to Wheeler et al., describes a public telephone network which includes enhanced capabilities with a distributed imaging system. The distributed imaging system provides centralized image processing to end users and access to a range of image management capabilities residing on a shared platform distributed through a switched telephone system. The shared platform functions as a service bureau in delivering such capabilities to end users.

The distributed imaging system embodies an image platform based on the client-server model with standard communications interfaces to service multiple separate user groups accessing different applications. User groups can supply applications programs which are stored and run on the central hardware in support of respective user requirements. The image server operations are provided as functional primitives. User applications are provided by combining the primitives in a control script.

U.S. Pat. No. 5,247,347, issued Sep. 21, 1993, to Litteral et al., describes a public switched telephone network architecture for providing video-on-demand services. A subscriber uses either a standard telephone instrument over the public switched telephone network or a dedicated control device over an ISDN packet network to order video programming. The request is transmitted to a designated video information provider and digital transmission connectivity is established between the video information provider and the central office serving the subscriber. Connectivity between the central office and subscriber is provided by asymmetrical digital subscriber line interface units over a local loop. The interface units frequency multiplex digital video information with voice information to the subscriber and support transmission of a reverse transmission channel from the subscriber to the central office for transmission on the ISDN packet data network back to the video information provider. The interfaces also allow baseband signaling and audio between the central office and the subscriber for conventional telephone instrument connectivity.

U.S. Pat. No. 5,410,343, issued Apr. 25, 1995, to Coddington, et al., describes video-on-demand services using the public switched telephone network. In this system a central office based public switched telephone network is used for supplying video information from a digital information storage medium to designated subscriber premises. The system utilizes subscriber loop transmission means for transferring (1) selected video information from a central office to the subscriber premises, (2) subscriber order data from the subscriber premises to the central office location, and (3) telephone service signals between the subscriber premises and the central office.

A switch at the central office receives the subscriber order data from the subscriber loop transmission means. A video gateway in turn is responsive to the subscriber order data from the switch for producing video routing data. A file server, responsive to requests received from the video gateway, obtains selected video information from the digital information storage medium. A cross-connect switch in turn is responsive to the video routing data for transmitting the video information from the file server to the subscriber loop transmission means. Asymmetrical digital subscriber line interface (ADSL) units over a local loop carry the necessary signaling between the subscribers and information providers. The interface units frequency multiplex digital video information with voice information to the subscriber and support transmission of a reverse control channel from the subscriber to the central office for transmission back to the information provider.

U.S. Pat. Nos. 4,890,320 and 4,995,078, issued Dec. 26, 1989, and Feb. 19, 1991, respectively, to Monslow et al., describe programming-on-demand and impulse pay-per-view delivery systems that utilize at least in part the public switched telephone network. These patents disclose a television broadcast system for real-time transmission of a viewer chosen program at a viewer requested time for the requesting viewer's television receiver. The system comprises a program collection, which stores TV programs on a video tape. Each program is assigned and labeled with a catalog number. A viewer request is transmitted using a conventional telephone over the public switched telephone network to a scheduling computer. The chosen program is transmitted at the requested time over a broadband cable for viewing on the requesting viewer's television receiver. A control unit prevents other households connected to the cable from viewing the program.

U.S. Pat. No. 4,949,187, issued Aug. 14, 1990, to Cohen describes a video communications system comprising a remotely controlled central source of video and audio data. This system allows home viewers to select from a choice of movies or other video and audio data that may be transmitted from the central source to be stored at the viewer's premises. The viewer can play the selection at any convenient time of his choosing. The central source may store the data digitally. Movies that need to be frequently accessed are stored on disks. Movies that are accessed only infrequently are archived. A distribution system CPU controls the bi-directional flow of data from both types of drives. Several movies can be transmitted simultaneously to different viewers through a plurality of input/output controllers. To make use of a single transmission media, such as a telephone line, a multiplexer is used which may multiplex in the time domain or the frequency domain.

U.S. Pat. No. 4,381,522, issued Apr. 26, 1983, to Lambert, discloses a cable television system which includes a plurality of selectable video signal sources having suitable television program material. The system enables a viewer to select desired program material available by telephone at a remote location and have the selected material promptly available for viewing.

U.S. Pat. No. 4,888,638 issued Dec. 19, 1989, to Bohn, discloses a marketing research system for substituting stored TV programs for regularly scheduled, broadcast TV programs. The substitute TV programs may be transmitted from a central office via telephone lines to households of cooperating panelists for storage at the household premises.

More recently, several different wideband digital distribution networks have been proposed for offering subscribers an array of video services, including true video-on-demand service. The following U.S. patents disclose representative examples of such digital video distribution networks: No. 5,253,275 to Yurt et al.; No. 5,132,992 to Yurt et al.; No. 5,133,079 to Ballantyne et al.; No. 5,130,792 to Tindell et al.; No. 5,057,932 to Lang; No. 4,963,995 to Lang; No. 4,949,187 to Cohen; No. 5,027,400 to Baji et al. and No. 4,506,387 to Walter.

A high percentage of television service to residential customers is now provided by coaxial cable delivery networks (CATV). CATV provides broad bandwidth and it is the expressed intention of cable television operators to provide local telephone service over their existing cables. At the same time, wireless or radio links are providing co-called wireless cable TV, as well as satellite delivery of television and data communication signals. In addition, the interexchange or long distance telephone carriers have expressed an intent to supply local connectivity for their interexchange services, thereby eliminating their need to connect through local exchange carriers and their local loop.

In this competitive context it would seem probable that at least some existing local exchange carrier (LEC) local loops may become unused or under used. As a consequence it would be desirable and advantageous to LEC's to provide an alternate usage for such links and an effective and economical method for measuring usage for billing purposes. It is accordingly an object of the present invention to provide an arrangement and method for utilizing portions of the existing public switched telephone network for alternate purposes, while efficiently and conveniently providing a method of measuring the usage of such circuits for billing purposes.

DISCLOSURE OF THE INVENTION

According to the invention there is provided an arrangement wherein one or more telephone company local loops to subscriber premises may be utilized in whole or in part for providing to such premises a connection to the service platform of a third party alternate service provider. The alternate service provider may be another local telephone company, an interexchange carrier, a video service provider, a multi-media service provider, or the like. The use of the local loop is leased to the third party service provider at a rate dependent upon the usage and nature of usage of the circuit.

Information and data to permit efficient and convenient billing for leased usage of such loops is implemented by providing on the local loop a passive monitor. The monitor detects and temporarily stores data relating to the commencement and termination of signaling, the time of day, and the nature of the signaling that occurs. Thus, charges may be dependent not only upon the time duration of signaling, but also on the rate of information transferred.

Data collected from the monitors is stored at a monitor center from which it is transferred to a billing operation such as the telephone company Revenue Accounting Office (RAO). In the process of transfer of the information to the RAO it may be expedient to store the information in a convenient switch journal for transfer to the RAO over existing switch journal to RAO links.

The data may be transferred from the monitors to the central storage through varying known procedures. The monitors are provided with identifying indicia, such as numbers, and are preferably provided with a buffer memory for temporarily storing data. The central storage includes a processor and can periodically sweep or scan the monitors to collect the data. Alternatively the monitors, which also include a microprocessor and clock, may periodically transmit or download their identification and data to the monitor center storage. As a still further alternative the monitors may download data on a real time basis.

It is another feature of the invention that the monitors may be implemented as a part of a monitor-switch module. This module provides the option of connecting the local loop which extends to the customer premise to either the third party service provider or to an end office telephone company switch. This permits the possibility of part-time leasing of the loop or of simultaneous loop usage by the third party service provider and the telephone company. The latter usage is possible using non-interfering signaling modes by the two parties. Control of the necessary switching may be implemented without the necessity of additional wiring by using non-interfering in-band signaling.

It is another feature of the invention that the link between the monitors and the monitor center for providing the monitor data to the monitor center may take multiple forms. According to one preferred embodiment of the invention, where a local loop is broken or disconnected remote from the end office or monitor center, the link to the monitor center may be provided by using that portion of the disconnected loop which formerly was connected to the switch for serving the telephone terminal in the customer premise. The other portion of the disconnected loop which extends to the customer premise is then connected to the alternate service provider's line to the service platform of such provider. The monitor is coupled to the loop at this location and the data connection of the monitor to the monitor center is made via the portion of the former local loop extending to the end office. As an alternative, separate links may be provided to connect the monitors to the monitor control center. As a still additional alternative, wireless or radio links may be utilized between the monitors and the monitor control center.

BRIEF DESCRIPTION OF DRAWINGS

The invention will be understood and its numerous objects and advantages will become more apparent to those skilled in the art by reference to the following drawings, in conjunction with the accompanying specification, in which.

BEST MODE FOR CARRYING OUT THE INVENTION

Figure 1:
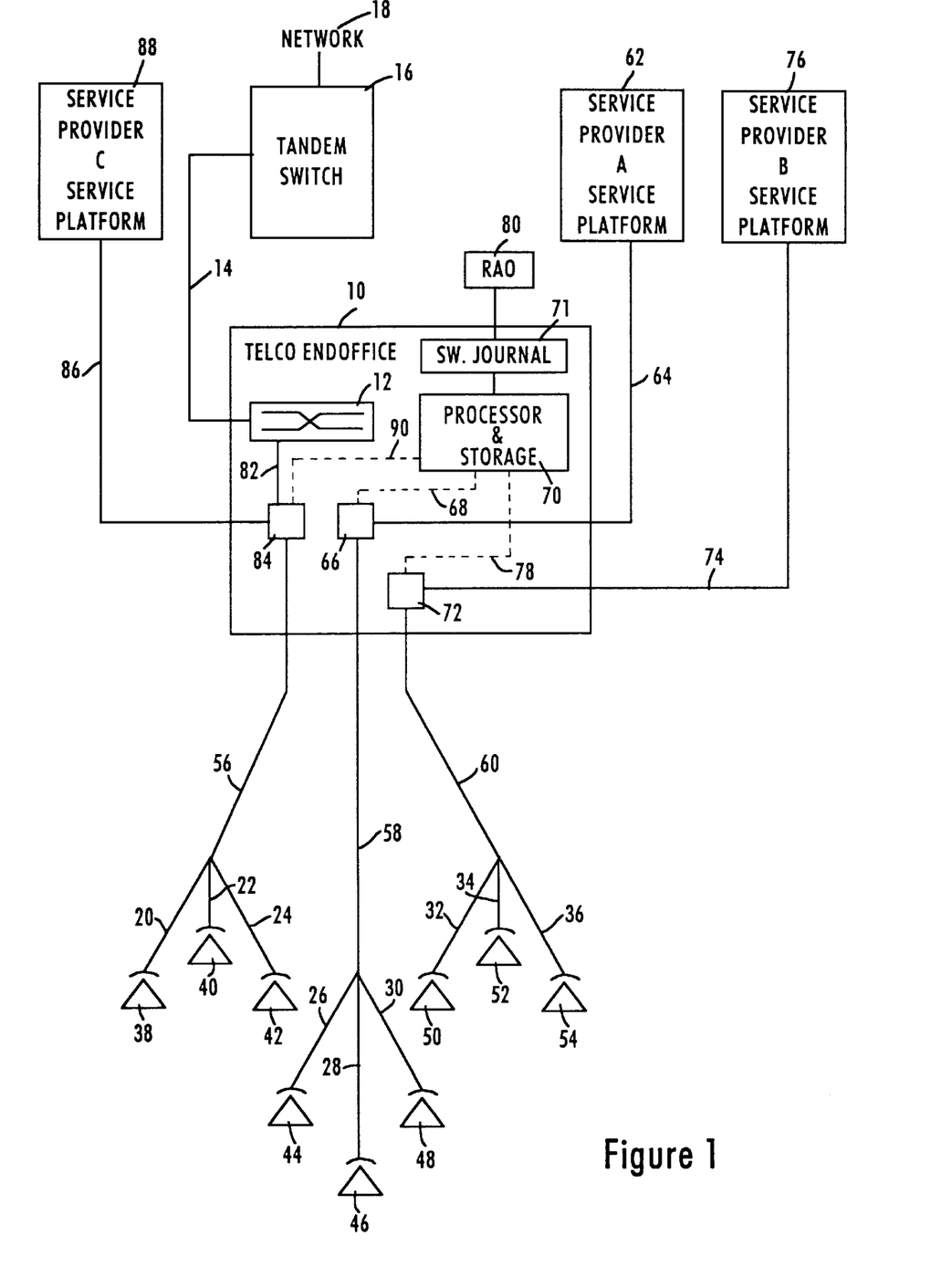
FIG. 1 is a simplified block diagram illustrating an arrangement to provide leased access of local loops in a switched telecommunications network to third party providers including an arrangement for monitoring, measuring and billing for usage of such leased circuits.

FIG. 1 is a simplified block diagram illustrating an arrangement to provide leased access to local loops in a switched telecommunications network to third party providers. The illustrated arrangement includes a system for monitoring, measuring and billing for such usage of the leased circuits on the basis of both the amount and nature of such usage.

Figure 2:
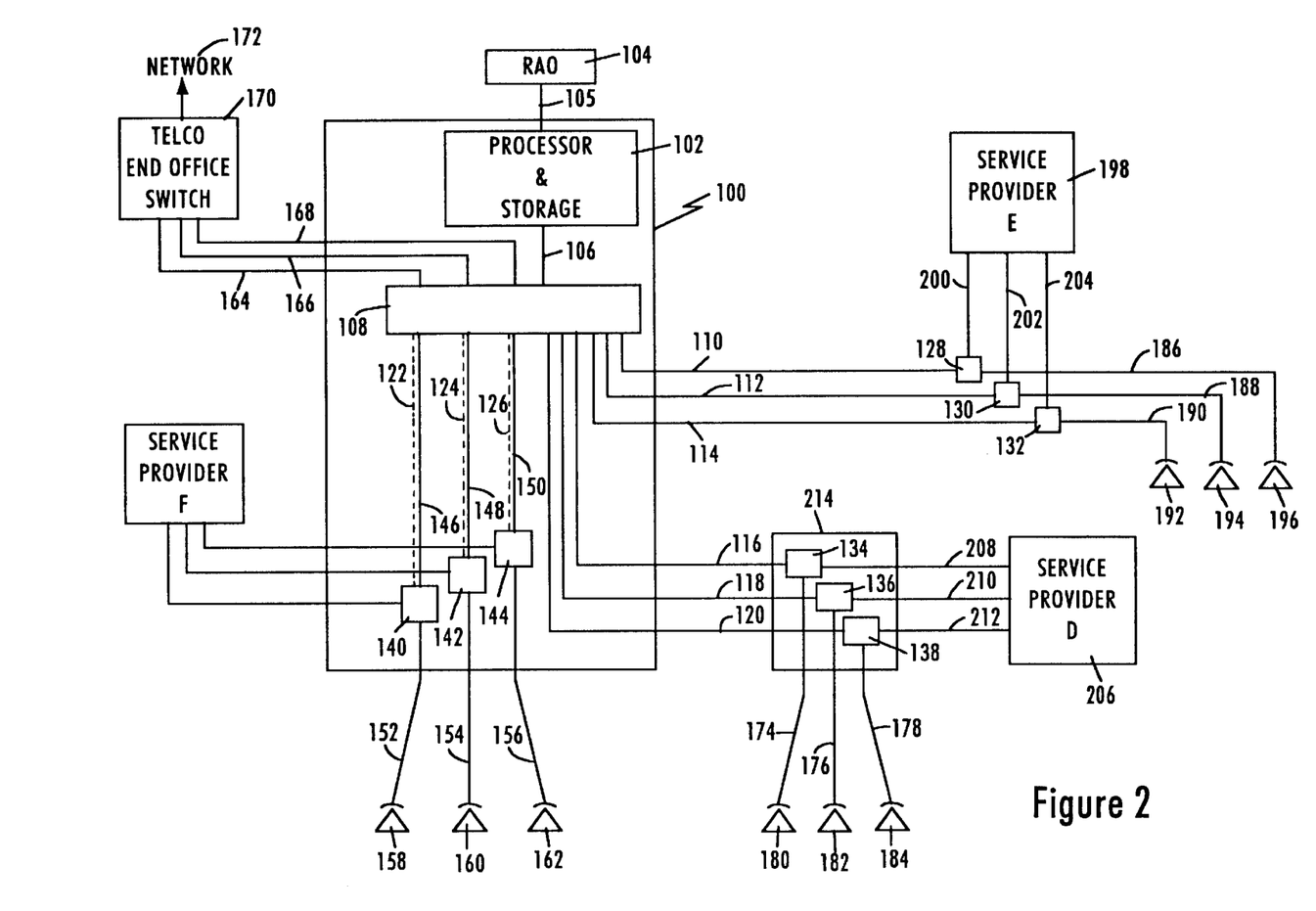
FIG. 2 is a simplified block diagram illustrating another arrangement to provide leased access of local loops in a telecommunications network to third party providers including an arrangement for monitoring, measuring and billing for usage of such leased circuits.
Figure 4:
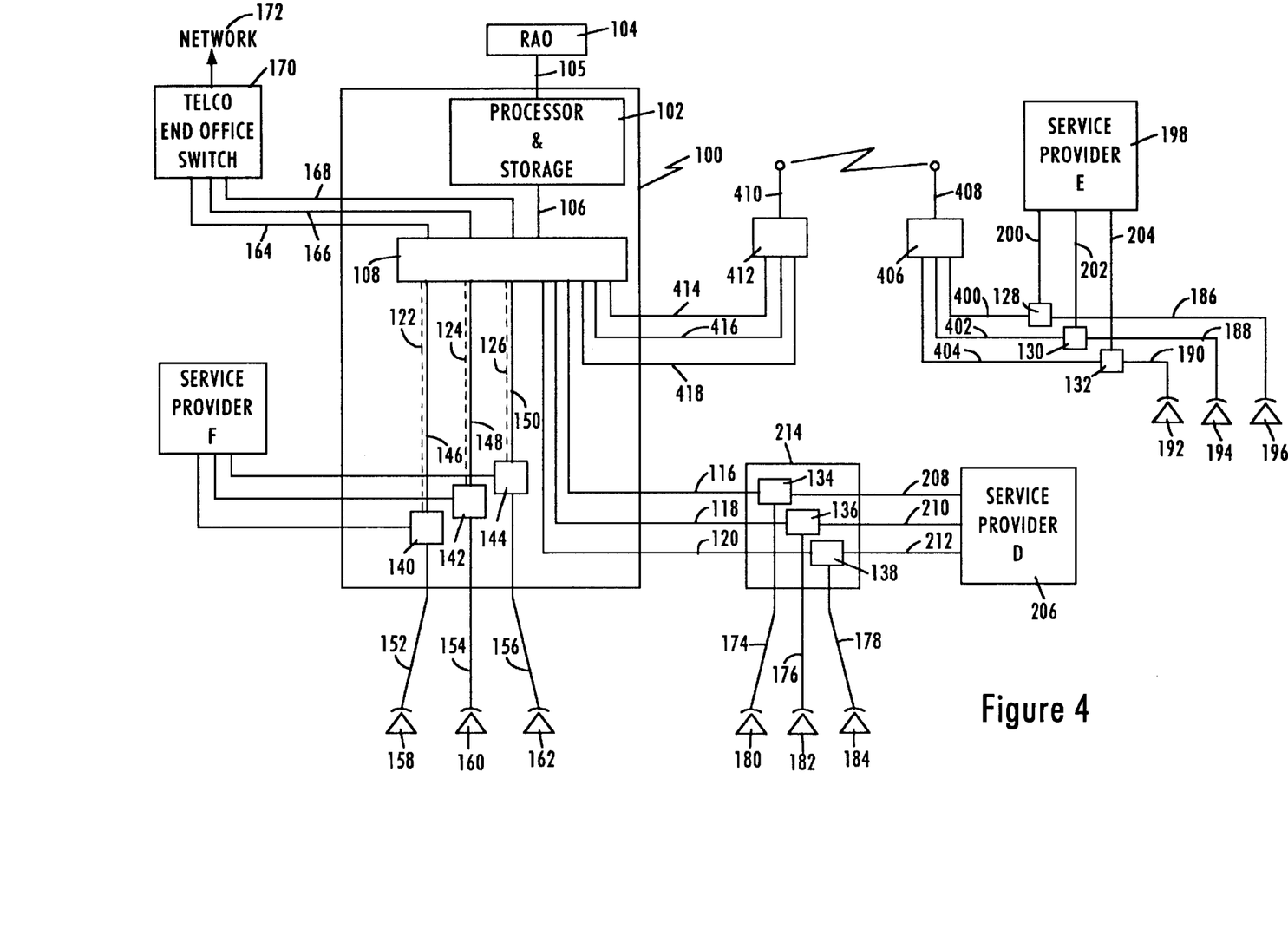
FIG. 4 is a simplified block diagram illustrating still another arrangement to provide leased access of local loops in a switched telecommunications network to third party providers including an arrangement for monitoring, measuring and billing for usage of such leased circuits.

Referring to FIG. 1 there is shown an end office 10 of a local exchange carrier (LEC), which could be either a Regional Bell Operating Company (RBOC) or an independent telephone company which provides local telephone and related services. The LEC end office 10 typically includes a program controlled switch shown at 12. Such a switch may be a 5ESS switch manufactured by AT&T or equivalent switches available from other manufacturers. The switch 12 is connected by a suitable trunk 14 and tandem switch 16 to the telecommunications network indicated generally at 18. In its original capacity as an LEC end office switch the switch 12 provided connection to a series of local loops 20–36 connected to telephone terminals 38–54. It will be appreciated that these local loop connections are conventionally made and disconnected at the distribution frame. The frame is illustrated in FIGS. 2 and 4 but is not specifically shown in FIG. 1. The local loops have customer premise ends, which are connected to customer premise equipment (CPE), and telephone company (Telco) ends. The Telco ends normally terminate in the Telco central office which constitutes the end office for the loops. However, as further discussed herein, different sites for termination may be provided. The end office switch connections to the Telco ends of local loops are made via the distribution frame, which is also the terminus for the lines which make the actual switch connection. When a particular loop terminating at the distribution frame is disconnected from the switch, this disconnect commonly occurs via jumpers at the distribution frame. Thus local loop terminations at the central office remain on the distribution frame, as do switch connections. However, when the local loop terminations are disconnected from the switch connections at the distribution frame, this normally occurs by disconnecting the jumpers which formerly completed the connection. For convenience of illustration the local loops 20, 22 and 24 are shown in the form of a cable 56 and the remaining local loops are shown as cables 58 and 60.

According to the invention the local loops 26, 28 and 30, shown cabled at 58, are leased to an alternate service provider A. Service provider A has a service platform 62 connected to the loops 26, 28 and 30 through an alternate service provider owned cable 64 to the LEC owned cable 58 which feeds the terminals 44, 46 and 48. The connection is made through a monitor 66. The connection through the monitor may be of a series nature such that the service provider signal passes through the monitor or, alternatively, the monitor may be inductively or otherwise coupled to the line carrying the service provider signal.

The monitor shown as a single element at 66 actually comprises separate monitor units for each of the local loops 26, 28 and 30 for monitoring the individual usage of those loops, as presently described in greater detail. The individual monitor units in monitor 66 are connected via a data link or links 68 to a processor and storage 70. In similar fashion the local loops 32, 34 and 36 are connected through cable 60, monitor 72 and cable 74 to yet another service provider B at that service provider's service platform 76. The monitor 72 again comprises three individual units for the separate loops 32, 34 and 36. These units are connected via a data link or links 78 to the monitor center processor and storage 70.

Local loops 26–30 and 32–36 are leased to service providers A and B for charges based on usage and nature of usage, i.e., voice band, broadband, data rate, etc. It is anticipated that the lease agreements would identify the nature of usage intended and specify use rates for the particular type of service. This would permit the usage monitors indicated at 66 and 72 to be designed for measuring the intended usage. On the other hand, more universal monitors may be utilized if this should prove advantageous.

The monitor units are connected by data links 68 and 78 to the processor and storage 70. This unit compiles a database of identified per loop cumulative usage by duration, time of day and nature of usage. For example, each monitor can mark the time of initiation of usage of its link, the time of day, the frequency, data rate, and bandwidth of use and the time of termination of that usage. The frequency, data rate and bandwidth utilized may change during usage and this is duly recorded in the processor and storage 70. The processor and storage 70 periodically formulate and transmit summary reports of link usage by customer to the switch journal 71 and from there to an appropriate billing entity such as the Revenue Accounting Office (RAO) 80. At the end of each month the records accounting office may compile and submit bills to the respective customers for their usage of the leased links.

Referring to the left-most illustrative telephone terminals 38–42 served by the LEC end office switch 12, this set of loops is shown connected to the switch 12. However, the loops may also be leased on a full or part-time basis to an alternate service provider. When the loops 20–24 are served by the LEC switch 12, the cable 56 is connected to the switch at 82. However, the cable 56 is connected to cable 82 through a combined monitor and switching module 84 described in detail hereinafter in connection with FIG. 3. The monitor in the combined module 84 provides a connection 86 to a the third alternate service provider C at that provider's service platform 88. The switch and monitor module 84 is also connected via data link 90 to the processor and storage unit 70.

This arrangement provides several options. The LEC may provide plain old telephone service (POTS) to the telephone terminals 38–42, while granting to the service provider C a lease to use the local loops 20–24 for non-conflicting or non-interfering service. Such service may be in a frequency band separated from the conventional 4,000 KHz band utilized by the voice signal. That service usage can be monitored via the monitor unit 84 and billed by the RAO as previously described. At the same time the LEC may provide its own POTS service to one or more of the terminals 38–42. It will be understood that simultaneous service by the third party alternate service provider terminates in a terminal other than the POTS or other telephone served by the LEC. Such a terminal may be a video, facsimile, printer, or the like. The monitor module 84 contains separate sub-units for the individual loops 20–24 as previously described.

Alternatively to the foregoing, service provider C may lease one or more of the loops 20–24 on an as needed basis at such times as the loop can be seized in an on-hook condition. As a still further alternative, service provider C may choose to lease the entire capacity of the loops either on a demand basis or at specified times of day. In this situation the loops are disconnected from the switch during the time of use by the alternate service provider. A central office controlled switch may be provided at or adjacent to the switch 12 for this purpose.

Referring to FIG. 2 there is shown another preferred embodiment of the invention. While the connections between the alternate service providers and the local loops are shown as being made within an LEC end office in the embodiment in FIG. 1, it is not necessary that these connections be concentrated. In FIG. 2 there is shown an embodiment of the invention wherein alternate service providers connect to their leased local loops at distributed sites. In this embodiment a monitor center 100 may be located at any convenient site. The monitor center houses the processor and storage 102 which is connected to the revenue accounting office (RAO) 104 via a suitable link 105.

Figure 3:
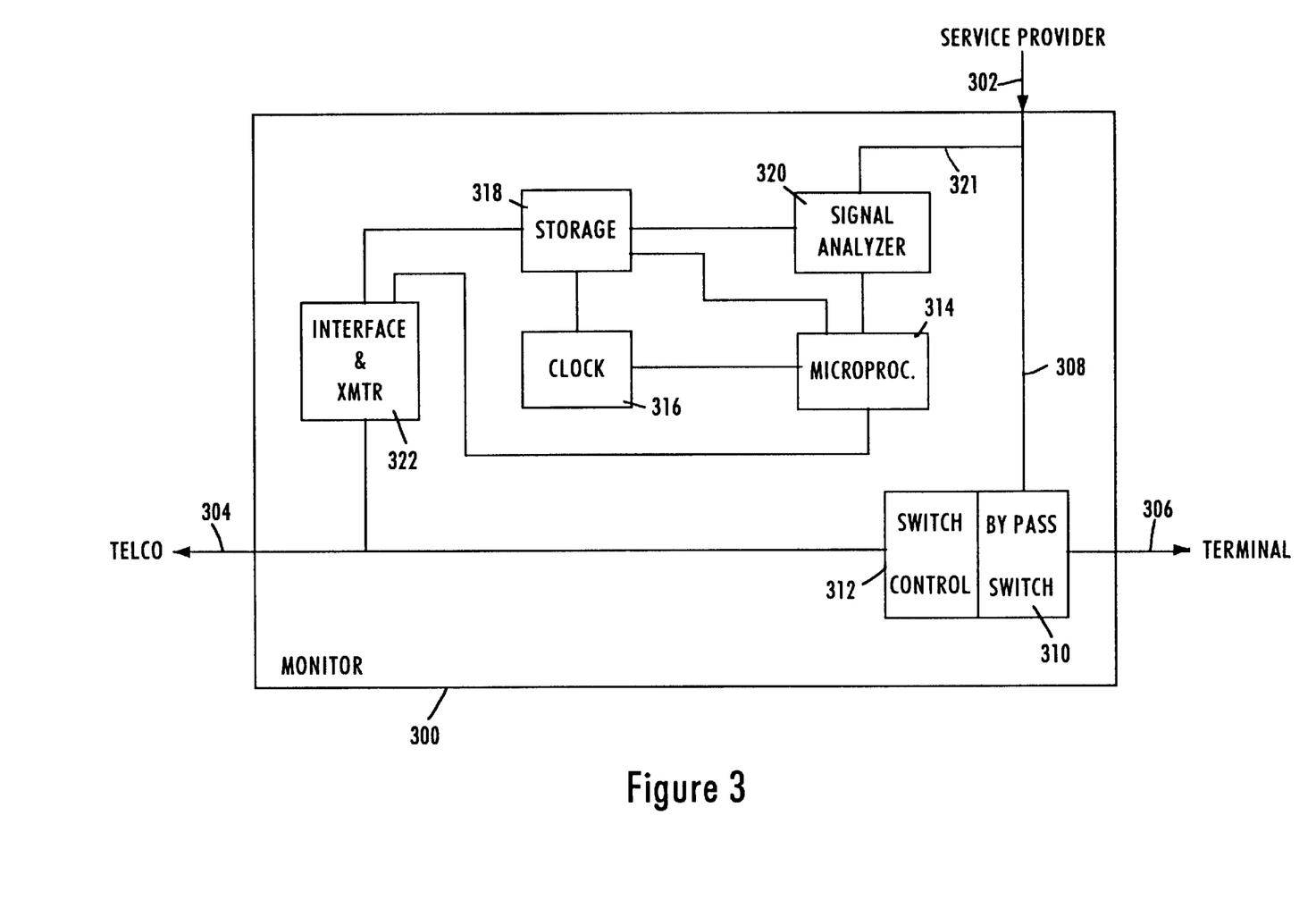
FIG. 3 is a simplified block diagram of a monitor-switch module suitable for use in the system and method of the invention.

The processor and storage 102 is connected by a data link or links 106 to a connection or distribution frame 108 for connection to the monitor leads 110–126. These monitor leads in turn are connected to outdoor mounted monitors 128–132, vault mounted monitors 134–138, and monitor center mounted monitors 140–144. The monitor center monitors 140–144 constitute the individual monitors in a monitor module such as the monitor module 84 in FIG. 1 and the module 300 illustrated in FIG. 3, presently to be described. These units perform both monitor and switching functions. Monitors 140–144 are connected to the distribution frame 108 not only by data links 122–126 shown with broken lines, but also by local loop lines shown as solid lines at 146–150. These local loop lines provide connection through the monitor-switch units 140–144 to the outdoor local loops 152–156 which terminate at telephone terminals 158–162. The local loops 152–156 are connected through the distribution frame 108 to lines 164–168 to the LEC end office switch 170. The switch 170 in turn is connected to the switched telephone network indicated generally at 172.

The second set of monitors 134–138 is not mounted in the monitor center 100 but in an externally located site 214. Monitors 134–138 connect local loops 174–178 to service provider D at 206 via lines 208–212. By way of example, the monitors 134–138 may be housed in a controlled environmental vault (CEV) 214. The monitors 134–138 are connected to the distribution frame 108 by loop lines 116–120.

The third group of monitors 128–132 is outdoor mounted and may be overhead, pedestal or otherwise mounted. The local loops 186–190 connect the premises housing telephone terminals 192–196 to alternate service provider E. The monitors 128–132 may be exterior units mounted singly or in clusters on overhead structures.

It is a feature of the invention that the monitor connections to the distribution frame 108 may be made through the use of the conductors which previously served as portions of the local loops from the end office switch serving the original telephone terminals. This is particularly applicable to the outdoor monitors 128–132 and the CEV monitors 134–138. This use of the disconnected local loop leads facilitates implementation of distributed connections to the alternate service providers and distributed monitoring. When this is done there is no need to locate or install separate monitor data collector leads from the monitors to a monitor center. The installation is facilitated in that the technician making the monitor connection needs only to break the existing local loop, connect the telephone terminal end to the alternate service provider, and connect the former switch end to the data terminals on the monitor. The monitor is either inductively coupled to the leased loop portion, inserted in series therewith, or bridged onto that portion of the local loop. The monitor center may conveniently be sited proximate an LEC network switching office for ready connection to the network.

It is possible to use these existing local loop leads which are now connected to the monitor center to serve combination monitor-switch modules such as units 140–144 by conducting the necessary switch control via in-band signaling over the loop. Such signaling may be used not only from the monitors to the processor and storage 102 but also over the connection to the alternate service providers. This permits the alternate service providers to also maintain a running compilation of individual line usage where this is desired.

Referring to FIG. 3 there is shown a simplified block diagram of an illustrative monitor-switch module which may be used in the system of the invention. The monitor-switch module 300 is connected to its alternate service provider at 302, to the LEC end office at 304, and to the external loop and customer premise terminal at 306. The service provider connection at 302 continues in module 300 as line 308. Line 308 is connected to a bypass switch module which comprises a switch 310 and a switch control 312. The switch control and switch are also connected to the LEC line 304 which goes to the LEC switch (not shown), and to the customer terminal line 306 and to the local loop to which it is connected.

When the local loop 306 is leased by the service provider on a full time basis the switch 310 connects the terminal and loop line 306 directly to the incoming service provider line 308. The terminal and loop line 306 are then disconnected from the LEC switch line 304. If the contrary situation exists where the LEC is serving the loop and telephone terminal on a full time basis, the converse is true. The loop 306 is then directly connected to the LEC line 304 and is disconnected from the service provider lines 308 and 302.

The condition of the switch 310 may be controlled by the LEC by in band signaling to the switch control 312 over the line 304. If desired, the LEC may provide for shared usage of the loop 306 and permit the service provider 302 the ability to control the switch by similar inband signaling over the service provider line 308. A contention situation may exist at the switch 310 which may be handled by conventional busy signal protocols or a similar arrangement. The agreement between the LEC and the alternate service provider may obviously establish the conditions for solving such contention situations. The availability of this type of switching can also be used to permit the service provider access to the LEC switched network under agreed conditions.

The monitor module 300 also contains a microprocessor 314, clock 316, storage 318, signal analyzer 320, and interface and transmitter or modem 322. The microprocessor controls the signal analyzer, storage and transmitter or modem. The signal analyzer 320 is connected to the incoming service provider signal via connection 321 and provides an output which indicates the presence or absence of a service provider signal, the nature of the signal, the baud rate or rate of information transfer, and other details of the signal where desired. Such analyzers are well known in the art and in an illustrative embodiment may take the form of the analyzer manufactured by Advanced Electronic Applications, Inc. under their model number PK-232MBX.

The output of the signal analyzer 320 is periodically connected to the storage 318 under control of the microprocessor and such output is recorded along with the time of each entry. This provides in the storage 318 a database of usage which shows the time and duration of usage and the nature of the signal or signals being carried. This data is periodically transferred to the processor and storage 70 or 102 of the LEC for billing purposes as previously described in connection with FIGS. 1 and 2.

It is also a feature of the invention that billing information may be supplied directly to the service provider for purposes of the service provider billing its own customers. Such billing information may be supplied by the LEC either from the RAO via the telephone network or, as an alternative, the microprocessor in the monitor may be programmed to effect a connection from the transmitter or modem 322 to the providers line 308 through the switch 310 for transfer direct to the service provider by suitable signaling over that line. If desired by the service provider the monitor may also be arranged to monitor the identity of the channel being delivered to the subscriber over the loop. If such a feature is desired the monitor may be provided with the added feature of making such an identification in the manner shown by way of example in the monitor described in U.S. Pat. No. 4,893,248, issued Jan. 9, 1990 to Pitts et al.

Referring to FIG. 4 there is shown yet another embodiment of the invention wherein the link between the monitors and the monitor center is provided in a wireless fashion by a suitable radio connection. FIG. 4 shows an embodiment of the invention similar to that shown in FIG. 2 with the exception of the link provided between the monitors 128–132 for service provider E and the monitor center 100. According to this feature of the invention the data connection to the monitors 128–132 is fed via lines 400, 402 and 404 to a suitable multiplexer, modulator and transmitter 406. An antenna 408 radiates the modulated carrier, preferably at a frequency in the VHF band or above. This signal is received by a receiving antenna 410 of a receiver, demodulator and demultiplexer 412. From the unit 412 the demultiplexed signals are fed via leads 414, 416 and 418 to the distribution frame 108 and from there via the link 106 to the processor and storage 102. The transmitter, modulator, multiplexer and receiver, demodulator and demultiplexer may be of any suitable type well known to those skilled in the art and may, for example, be of the type described in detail in U.S. patent application Ser. No. 08/405,685 filed Mar. 17, 1995, and co-assigned with the present invention.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A switched telephone network including multiple switches connected by trunks, at least one end office switch served by a first service provider, and local loop lines for connecting said switch through a distribution frame interface to customer premise terminals at the distal ends of said local loop lines, said local loop lines having said distal ends connected to customer premise terminals and having near ends connected to said interface for connection to said switch, at least certain of said lines being disconnected from said end office switch at the near ends of said lines at said interface;

monitors coupled to portions of said disconnected local loop lines;

at least a second service provider connected to the portions of said disconnected local loop lines extending to the distal ends thereof for connection to customer premise terminals for providing service provider signals over said local loop lines to terminals at said customer premises;

said monitors being coupled to said portions of said local loop lines connected between said customer premises and said second service provider;

said monitors including detectors for detecting the commencement and discontinuance of signals of said second service provider on said lines;

said monitors also being connected to at least the portions of said disconnected local loop lines extending from said monitor to said near ends thereof at said interface;

a central storage connected to said near ends of said lines extending from said monitors; and said central storage storing information regarding the times of commencement and discontinuance of service provider signals on said lines to said customer premises.

2. A telephone network according to claim 1 including a billing compiler accessing said stored information and preparing bills for usage of said monitored lines.

3. A telephone network according to claim 1 wherein said monitors include signal analyzer means for detecting the nature of the monitored signals.

4. A telephone network according to claim 3 wherein said central storage stores information regarding the nature of said monitored signals; and including a billing compiler accessing said stored information and preparing bills based on duration and nature of usage of said monitored lines.

5. A telephone network according to claim 1 including at least one monitor which includes a first bypass switch having a terminal connected to a local loop line extending to a customer premise so that in one switch condition the switch is connected to a customer premise terminal at the distal end of said local loop line and in another condition said second service provider is connected to a customer premise terminal at the distal end of said local loop line.

6. A telephone network according to claim 5 including a second bypass switch connecting the near end of one of said local loop lines to said end office switch in one condition and connecting said near end of said line to said central storage in a second condition.

7. A switched telephone network including multiple switches connected by trunks, at least one end office switch served by a first service provider, and local loop lines for connecting said switch through a distribution frame interface to customer premise terminals at the distal ends of said local loop lines, said local loop lines having said distal ends connected to customer premise terminals and having near ends connected to said interface for connection to said switch, at least certain of said lines being disconnected from said end office switch at the near ends of said lines at said interface;

at least one service provider connected to the portions of said disconnected local loop lines extending to the distal ends thereof for connection to customer premise terminals for providing service provider signals over said local loop lines to terminals at said customer premises;

said disconnected local loop lines having a discontinuity therein between a first portion extending to said near end and such interface and a second portion extending to said distal end;

monitors coupled to said second portions of said local loop lines;

said monitors including detectors for detecting the commencement and discontinuance of service provider signals and for detecting the nature of the service provider signals on said local loop lines;

said monitors having a connection to said first portions of said local loop lines extending from said monitors to the near ends thereof at said interface;

a central storage connected to the near ends of said lines at said interface;

said central storage storing information regarding the times of commencement and discontinuance and the nature of service provider signals on said local loop lines; and a billing compiler accessing said stored information and preparing bills for usage of said monitored local loop lines.

8. A telephone network according to claim 2 including at least one monitor which includes a first bypass switch having a terminal connected to a second portion of one of said local loop lines so that in one switch condition the switch is connected to a customer premise terminal at the distal end of said local loop line and in another condition a second service provider is connected to a customer premise terminal at the distal end of said local loop line.

9. A switched telephone network including multiple switches connected by trunks, at least one end office switch served by a first service provider, and local loop lines for connecting said switch through a distribution frame interface to customer premise terminals at the distal ends of said local loop lines, said local loop lines having said distal ends connected to customer premise terminals and having near ends connected to said interface for connection to said switch, at least certain of said lines being disconnected from said end office switch at the near ends of said lines at said interface;

at least one service provider connected to the portions of said disconnected local loop lines extending to the distal ends thereof and connected via said local loop lines to customer premise terminals for providing signals over said local loop lines to said terminals;

monitors coupled to the portions of said local loop lines connected between said customer premises and said service provider;

said monitors including detectors for detecting the commencement and discontinuance of service provider signals on said lines;

a central storage for storing information regarding the times of commencement and discontinuance of service provider signals on said lines; and communication links between said monitors and said central storage for communicating to said central storage said information regarding the times of commencement and discontinuance of service provider signals on said lines.

10. A telephone network according to claim 9 including a billing compiler accessing said stored information and preparing bills for usage of said monitored lines.

11. A telephone network according to claim 9 wherein said monitors include signal analyzers for detecting the nature of the monitored signals.

12. A telephone network according to claim 11 wherein said central storage stores information regarding the nature of said monitored signals; and including a billing compiler accessing said stored information and preparing bills based on duration and nature of usage of said monitored lines.

13. A telephone network according to claim 9 wherein said links comprise wire lines.

14. A telephone network according to claim 9 wherein said links comprise wireless links.

15. A switched telephone network including multiple switches connected by trunks, at least one end office switch served by a first service provider, and local loop lines for connecting said switch through a distribution frame interface to customer premise terminals at the distal ends of said local loop lines, said local loop lines having said distal ends connected to customer premise terminals and having near ends connected to said interface for connection to said switch, at least certain of said lines being disconnected from said end office switch at the near ends of said lines at said interface;

at least two service providers connected to one of said disconnected local loop lines and connected via said local loop line to at least one customer premise for providing non-interfering signals over said local loop line to said customer premise;

monitor means coupled to said local loop line connected between said customer premise and said service providers;

said monitor means including detectors for detecting the commencement and discontinuance of signals from said service providers on said local loop line;

a central storage for storing information regarding the times of commencement and discontinuance of service provider signals on said local loop line; and communication link means between said monitor means and said central storage for communicating to said central storage said information regarding the times of commencement and discontinuance of service provider signals on said local loop line.

16. A telephone network according to claim 15 wherein the signals from said service providers are frequency multiplexed on said line.

17. A telephone network according to claim 15 wherein the signals from said service providers are time division multiplexed on said line.

18. A switched telephone network including multiple switches connected by trunks, at least one end office switch, and lines for connecting said switch to customer premises terminals;

a service provider connected to at least one of said lines between said end office switch and the customer premise to which said line is connected, said service provider transmitting signals over said line to a terminal at said customer premises;

a monitor connected to said line between said customer premise and said service provider;

said monitor including a detector for detecting the commencement and discontinuance of signals from said service provider on said line;

a central storage linked to the portion of said line between said service provider and said customer premise; said storage storing information regarding the times of commencement and discontinuance of service provider signals on said line;

said end office switch receiving from said line upstream signals from said service provider or said customer premise.

19. A switched telephone network including multiple switches connected by trunks, at least one end office switch, and lines for connecting said switch to customer premises terminals;

a service provider connected to at least one of said lines between said end office switch and the customer premise to which that line is connected, said service provider transmitting signals over said line to a terminal at said customer premises;

a monitor connected to said line between said customer premise and said service provider;

said monitor including a detector for detecting the commencement and discontinuance of signals from said service provider on said line;

a central storage linked to that portion of said line between said service provider and said customer premise; said storage storing information regarding the times of commencement and discontinuance of service provider signals on said line;

said end office switch transmitting to said line non-interfering signals to said customer premises.

20. In a switched telephone network including multiple switches connected by trunks, at least one end office switch, and lines connecting said switch to customer premise terminals, the method comprising the steps of:

disconnecting at least one line from said end office switch;

creating a discontinuity in said disconnected line between the disconnected end and the customer premise end to form two line sections, one of said line sections extending from the disconnected end to said discontinuity and the other of said line sections extending from said discontinuity to said customer premise;

connecting a service provider to the line section extending to said customer premise;

coupling a monitor to said line section extending from said service provider to said customer premise;

transmitting signals over said line from said service provider to said customer premise;

detecting the commencement and discontinuance of signals from said service provider on said line at said monitor;

connecting said monitor to the end of said disconnected line at said discontinuity;

transmitting from said monitor over said line connected thereto to a central storage and storing at said central storage information regarding the times of commencement and discontinuance of service provider signals on said line to said customer premise.

21. In a switched telephone network including multiple switches connected by trunks, at least one end office switch, and lines connecting said switch to customer premises terminals, the method comprising the steps of:

disconnecting at least one line from said end office switch;

connecting a service provider to at least a portion of said disconnected line extending to a customer premise;

coupling a monitor to said line extending from said service provider to said customer premise;

transmitting signals over said line from said service provider to said customer premise;

detecting the commencement and discontinuance of signals from said service provider on said line at said monitor;

connecting said monitor to a storage via a link between said monitor and said storage;

transmitting from said monitor over said link to said storage and storing at said storage information regarding the times of commencement and discontinuance of service provider signals on said line to said customer premise.

22. A method according to claim 21 including the step of preparing a billing for usage of said line from said service provider to said customer premise based on said stored information.

* * * * *